United States Patent [19]

Nieh

[11] Patent Number: 5,118,435
[45] Date of Patent: Jun. 2, 1992

[54] ANTI-ICING COMPOSITIONS CONTAINING THICKENER BLEND HAVING POLYACRYLIC ACID AND COPOLYMER OF ACRYLIC ACID AND HYDROPHOBIC VINYL MONOMER

[75] Inventor: Edward C. Nieh, Austin, Tex.

[73] Assignee: Texaco Chemical Company, White Plains, N.Y.

[21] Appl. No.: 615,767

[22] Filed: Nov. 19, 1990

[51] Int. Cl.⁵ ............................................... C09K 3/18
[52] U.S. Cl. ........................................ 252/70; 106/13; 524/388
[58] Field of Search ............................ 252/70; 106/13; 524/388

[56] References Cited

U.S. PATENT DOCUMENTS

| | | | |
|---|---|---|---|
| 3,412,030 | 11/1968 | Wahlberg | 252/70 |
| 3,488,215 | 1/1970 | Shepherd et al. | 117/124 |
| 3,635,756 | 1/1972 | Shepherd et al. | 117/124 D |
| 3,940,356 | 2/1976 | Byrnes | 260/29.6 E |
| 4,141,919 | 2/1979 | Gremmelmaier | 260/594 |
| 4,283,297 | 8/1981 | Peters et al. | 252/70 |
| 4,358,389 | 11/1982 | König-Lumer et al. | 252/70 |
| 4,698,172 | 10/1987 | Tye et al. | 252/70 |
| 4,744,913 | 5/1988 | Salvador et al. | 252/70 |

FOREIGN PATENT DOCUMENTS 1272464  4/1972  United Kingdom .

OTHER PUBLICATIONS

"Carbopol ® Product Guide", B. F. Goodrich product bulletin, Oct. 1987.
WPI Abstract to DE 1940825-A.
WPI Abstract to FR 2057577-A.
WPI Abstract to De 2407123-B.
Chemical Abstracts 84(16): 106720j.
"Carbopol ® Water Soluble Resins", B. F. Goodrich product bulletin, Sep., 1987.
"Carbopol ® Product Guide," B. F. Goodrich product bulletin, Oct., 1987.
"Principal Characteristics of Carbopol Resins," B. F. Goodrich product bulletin, Feb., 1989.
F. Schosseler et al., "Swelling Kinetics of Small Spherical Ionic Gels," *J. Dispersion Science and Technology*, vol. 8, No. 4, pp. 321-339, 1987.
R. Y. Lochhead, et al., "Poly(acrylic acid) Thickeners," *Polymers in Aqueous media*, J. E. Glass, Ed., *Advances in Chemistry Series*, #223, pp. 113-147, 1989.

Primary Examiner—A. Lionel Clingman
Assistant Examiner—Christine A. Skane
Attorney, Agent, or Firm—Jack H. Park; Kenneth R. Priem; David L. Mossman

[57] ABSTRACT

Anti-icing compositions, such as used on aircraft wing surfaces, may be thickened using a blend of a polyacrylic acid and a copolymer of polyacrylic acid with a vinyl monomer, where the copolymer acts as a thickener modifier. The two polymers form a thickener blend. The polyacrylic acid may have a weight average molecular weight of from about 2,500,000 to about 3,500,000 and be slightly crosslinked with a diene monomer. The composition also contain an alkylene glycol component, such as propylene glycol, diethylene glycol and mixtures thereof. These compositions retain a high viscosity, even when diluted with water, and exhibit a highly pseudo plastic rheology indicating desirable flow off characteristics. A neutralizing agent to neutralize at least partially the carboxylic acid groups of the thickening blend is also preferably included.

15 Claims, No Drawings

ANTI-ICING COMPOSITIONS CONTAINING THICKENER BLEND HAVING POLYACRYLIC ACID AND COPOLYMER OF ACRYLIC ACID AND HYDROPHOBIC VINYL MONOMER

FIELD OF THE INVENTION

The invention relates to anti-icing compositions, and, in one aspect, more particularly relates to anti-icing compositions containing thickener compounds, which compositions are thereby especially suitable for use as aircraft anti-icers.

BACKGROUND OF THE INVENTION

Liquid substances applied to the airfoil surfaces of aircraft to prevent their freezing and being covered with ice in inclement weather are well-known and are important to ensure safe and proper take off of aircraft in winter. It is also well-known that aircraft departures are often delayed under such conditions and the anti-icing formulations must often be reapplied if the plane must wait an extended period. These liquids must also be stable not only through temperature extremes, but also during the taxiing phases of the take off procedure and thus must adhere to the wing surfaces during travel and and ground winds. The fluids may also be diluted somewhat through intentional dilution with water, such as during particularly cold conditions below the expected operating temperatures of the fluids to enable their application, or incidentally as through freezing rain conditions. In addition to these demands, the anti-icing materials must also change characteristics, becoming much less viscous, and flow off the wing surfaces during the relatively high shear conditions of take off. Such compositions are also useful in the de-icing or anti-icing of other surfaces besides air foils.

Other anti-icing compositions are known. For example, U.S. Pat. No. 4,744,913 describes an anti-icing and de-icing agent, based on glycols and water and having crosslinked acrylic polymers useful a thickener, and also containing customary corrosion inhibitors, surfactants belonging to the group of alkali metal alkylarylsulfonates and a neutralizing agent to adjust the pH to a basic value. The agent contains, as the thickener, two selected crosslinked acrylic polymers in a specific ratio by weight to one another, namely a selected crosslinked acrylic acid or alkali metal acrylate homopolymer and a selected crosslinked acrylic acid/acrylamide or alkali metal acrylate/acrylamide copolymer in a ratio by weight of 2:1 to 10:1. The neutralizing agent may be three compounds, each in a selected amount, namely ammonia, monoethanolamine, diethanolamine and/or triethanolamine as the first alkaline compound, potassium hydroxide as the second alkaline compound and a further alkali metal hydroxide as the third alkaline compound. The new agent was found to exhibit the particular advantage that it has a relatively low viscosity even at arctic temperatures and low shear rates, which ensures rapid and complete runoff of the agent at the take-off of the aircraft even under extreme conditions.

Partially neutralized polymers of acrylic acid form water swellable networks with high water retention capability and very fast kinetics of volume change have been reported by F. Schosseler, et al. in *J. Dispersion Sci. Technol.*, Vol. 8, p. 321, 1987. Further information about polyacrylic acids may be found in R. B. Lochhead, et al., "Polyacrylic acid thickener: The importance of gel microrheology and evaluation of hydrophobe modified derivative as emulsifier." *Polymers in Aqueous Media*, J. E. Glass, Editor, *Advances in Chemistry Series*, #223.

Publications which describe similar, but perhaps less relevant substances, include U.S. Pat. No. 3,940,356 which discusses ice release agents formulated from alkylene glycols having two to three carbon atoms, water, an alkanol and a salt of crosslinked polyacrylic acid.

Another liquid agent for de-icing and protecting against icing-up is described in U.S. Pat. No. 4,358,389, by means of which it is possible, in particular, to free the metal surface of aircraft rapidly and completely from ice, hoar-frost, snow and the like, and to protect the surface against further build-up for a relatively long period. The agent is essentially composed of several components, namely of (a) glycols, (b) water, (c) thickeners, (d) substances insoluble in water, (e) surface-active agents, (f) corrosion inhibitors and (g) alkaline compounds. The quantities are very specific in each case, the quantity of the components (a) and (b) being at least 94%, relative to the total weight of the agent. Its pH value is 7.5 to 10. The component (c) thickeners are crosslinked polyacrylates described in the patent in further detail and also in U.S. Pat. No. 2,923,692.

U.S. Pat. Nos. 3,635,756 and 3,488,215 describe a transparent, nonfogging coating which may be applied to a normally fogging transparent or reflecting substrate, such as vehicle windows, glasses, lenses, mirrors, masks, and the like. The nonfogging coating preferably comprises a hydrophilic acrylate or methacrylate polymer. The polymer can be modified by copolymerization with a monobasic or polybasic unsaturated carboxylic acid or partial ester thereof. The polymer can be crosslinked with a polyepoxide to increase its hardness.

An anti-icing fluid suitable for ground treatment of aircraft, being a glycol-based solution containing a gel-forming carrageenan, in an amount of less than 5 wt. % is described in U.S. Pat. No. 4,698,172. The carrageenan is present in the glycol-based solution in an amount sufficient to thicken the fluid to promote its adherence to aircraft surfaces when applied to a stationary aircraft. Use of this thickened deicing fluid does not adversely affect airfoil lift characteristics during takeoff, because the fluid exhibits shear thinning and readily flows off the aircraft surfaces when exposed to wind shear during the aircraft's takeoff run.

There is also U.S. Pat. No. 4,283,297 which discusses products for rapidly liberating areas covered by ice and/or snow, which products are composed in the following wt.%, relative to the total weight of all components: 60 to 79% of propylene glycol and 0 to 5% ethylene glycol or 70 to 85% ethylene glycol and 0 to 10% propylene glycol. In both cases, there are added 5 to 15 wt. % water; 5 to 20 wt. % urea and 1 to 5 wt. % monohydric aliphatic alcolhols having from 1 to 7 carbon atoms. The products are harmless, biologically degradable, non-corrosive and low flammability.

There remains a need for a thickened aircraft anti-icing composition that exhibits hightly pseudo plastic rheology and which under low shear conditions is relatively insensitive to temperature changes. It would also be advantageous if the fluid retained a high viscosity as the composition is diluted with water. The anti-icing fluids should also remain stable for relatively long periods of time to delay or avoid reapplication of the compositions during departure holdovers.

SUMMARY OF THE INVENTION

Accordingly, it is an object of the present invention to provide an antifreeze composition that can retain high viscosity as the composition is diluted with water.

It is another object of the present invention to provide an antifreeze composition which exhibits a highly pseudo plastic rheology so that it would have desirable flow off characteristics when used as an aircraft antiicing composition.

Another object of the invention is to provide an antifreeze composition which under low shear conditions having a viscosity that is relatively insensitive to temperature changes over the range of −25° C. to 20° C.

In carrying out these and other objects of the invention, there is provided, in one form, an anti-icing composition having an alkylene glycol component; a thickener blend with at least one polyacrylic acid and at least one copolymer of acrylic acid and a hydrophobic vinyl monomer; and an agent to neutralize at least part of the carboxylic acid groups present in the polymers of the thickener blend.

DETAILED DESCRIPTION OF THE INVENTION

It has been discovered that certain polymers and copolymers when used together as a thickener blend give desirable viscosity properties when used in anti-icing compositions, particularly in applications where high or consistent viscosity and/or pseudo plastic rheology is desired, such as in anti-icing compositions for aircraft where adherence to the airfoil surfaces, sometimes for long periods, is important.

The anti-icing compositions have two main portions. First, the composition has an alkylene glycol component, which may be made up of one or more alkylene glycols. For example, the alkylene glycol may be selected from ethylene glycol, propylene glycol, diethylene glycol, dipropylene glycol, and mixtures thereof, as examples only. Other alkylene glycols not specifically mentioned may also be useful. In some embodiments, the alkylene glycol component is at least 50%, but not more than about 65% by weight of the total anti-icing composition. In a preferred embodiment, the alkylene glycol component ranges from about 50 to about 55 wt. %, based on the total composition.

The thickener blend is the second important part of the anti-icing composition, and is comprised of polymers of acrylic acid, both homo-and copolymers thereof. The thickener blend has at least two different polymers. It is preferred that the first polymer be polyacrylic acid. In some embodiments, the polyacrylic acid has a weight average molecular weight of between about 2,500,000 and about 3,500,000. The term polyacrylic acids as used herein also encompasses substituted polyacrylic acids. However, polyacrylic acid is sparingly soluble in the glycols used in this composition and while poly(meth)acrylic acid may also find use herein, some substituted polyacrylic acids may be too insoluble in the appropriate glycols for practical use. This polymer may be slightly cross-linked with a diene comonomer at a crosslinked density of a low level which does not seriously affect its solubility in the anti-icing composition, but is high enough to help provide mechanical shear stability. Examples of suitable diene crosslinkers include, but are not necessarily limited to 1,3-butanediol diacrylate; 1,3-butanediol dimethacrylate; 1,4-butanediol diacrylate; 1,4-butanediol dimethacrylate; 1,6-hexanediol diacrylate; 1,6-hexanediol dimethacrylate; diethylene glycol diacrylate; diethylene glycol dimethacrylate; triethylene glycol diacrylate; tetraethylene glycol diacrylate; divinyl benzene and mixtures thereof. Examples of the first thickener component include, but are not necessarily limited to, Carbopol ® 672 and Carbopol 934 polyacrylic acids made by B. F. Goodrich Co.

The second polymer of the thickener blend may be a copolymer of acrylic acid, or derivatives thereof, and a hydrophobic vinyl monomer. This second polymer may also be referred to as a hydrophobic modifier. The acrylic acid portion of the comonomer may include substituted acrylic acid, for example methacrylic acid in particular, but also possibly methyl acrylate, 2-hydroxyethyl acrylate, 2-hydroxyethyl methacrylate, hexyl acrylates, and mixtures thereof. The vinyl monomer may be any suitable unsaturated hydrophobic vinyl-type monomer, including, but not limited to, n-decyl acrylate; n-decyl methacrylate; isodecyl acrylate; isodecyl methacrylate; Lauryl acrylate; Lauryl methacrylate; n-octyl acrylate; n-octyl methacrylate; 2-ethylhexyl acrylate; 2-ethylhexyl methacrylate; and mixtures thereof. The homopolymer of acrylic acid and the copolymer of acrylic acid with a hydrophobic vinyl monomer may be made by any of the suitable known additional polymerization techniques, such as by initiation with a suitable free radical initiator. Examples of these hydrophobic modifier copolymers include but are not necessarily limited to Carbopol ® 1610, 1621 and 1622 thickeners made by B.F. Goodrich Co.

The thickener component may be present in the antifreeze compositions in an amount from about 0.2 to about 0.8% by weight, preferably from about 0.2 to about 0.6% by weight. In one embodiment of the invention, from about 65 to about 98% of the thickener component or blend is the polyacrylic acid, whereas from about 2 to about 35% by weight of the blend is the copolymer of acrylic acid and the hydrophobic vinyl monomer. In one embodiment of the invention, the preferred range is from about 75 to 90% of the thickener blend as the polyacrylic acid, and about 10 to 25% of the thickener blend is the copolymer of acrylic acid (or derivatives thereof) and the hydrophobic vinyl monomer. It will be understood that these formulations are complex mixtures which interact in unpredictable ways. It should be understood that suitable amounts and proportions of these and subsequently discussed compounds cannot be specified with precision since workable compositions depend not only on the amounts of the various components, but also on their exact chemical structures and properties.

It is preferred that a neutralizing agent also be used in conjunction with the polyacrylic acid homo- and copolymers to at least partially neutralize them. The neutralizing agent may be selected from the group of alkaline metal hydroxides, organic amine bases and mixtures thereof. A corrosion inhibitor, discussed below, may also be useful as a neutralizing agent. The quantity of neutralizing agent required is determined by molecular weight of the agent and the quantity of the polyacrylic acid employed in a specific formula and the amount of free acid groups possessed by the polymers. In general, the base neutralizing agent is needed to neutralize from about 20 to about 90% of the carboxylic acid groups in the thickener blend. Preferably, sufficient base is present to neutralize 30 to 80% of the carboxylic groups.

A corrosion inhibitor is also preferred as part of the antifreeze composition. The corrosion inhibitor may be any of those conventionally used in the art of aircraft anti-icing compositions, and in one embodiment is preferred to be an alkaline metal salt of tolyl triazole or an alkaline metal salt of benzotriazole or mixtures thereof, to list only a few examples. The corrosion inhibitor also helps prevent the glycols from possible combustion under the influence of an open electrical charge. In another embodiment of the invention, the corrosion inhibitor is present from about 0.2 to about 0.5% by weight of the composition, and may also serve to neutralize the polyacrylic acids of the thickener blends.

An optional ingredient of the inventive antifreeze compositions is a non-ionic surfactant that can improve wetting of the aircraft surface. The surfactant should not contribute to excessive foaming of the composition. In one embodiment, the surfactant is employed at a level of between about 0.1 to about 0.5% by weight, based on the total composition. Suitable surfactants include, but are not necessarily limited to, ethoxylates of octyl phenol and nonylphenol, block copolymers of ethylene oxide and propylene oxide and related non-ionic surfactants, and mixtures thereof.

As is conventional, deionized water provides the balance of these anti-icing composition. Deionized water may be used to dilute the composition, if necessary for deicing purposes.

The compositions of this invention have been found to retain a high viscosity as it is diluted with water. This characteristic is unexpected for these formulations. Additionally, the compositions have exhibited a highly pseudo plastic rheology, indicating that they possess desirable flow off characteristics. That is, the compositions will be retained on the aircraft surfaces for sufficiently long periods, but will liquify under relatively high shear. The viscosity under low shear conditions for these materials is relatively insensitive to temperature changes between about −25° C. and about 20° C. This feature will allow a relatively predictable thickness of the fluid to be applied to the aircraft and lead to predictability in holdover time over a wide range of temperatures. It is important that anti-icing compositions be as stable as possible between application and aircraft departure, even if this is a long time period under adverse conditions. The materials of this invention show good properties for the needed stability in these environments.

The invention will be further illustrated with reference to the following Examples.

EXAMPLE I

A mixture of Carbopol 672, 48 grams, and Carbopol 1610, 12 grams, was added to 1940 grams of deionized water to make up a stock solution of 3.0% polyacrylic acid in water. The above prepared mixture, 83.25 grams thereof, was added to a mixture of propylene glycol, 500 grams; sodium tolyl triazole, 5 grams of a 50% aqueous solution; and Surfonic® N-95 surfactant, 5 grams. Finally, deionized water was added to make up a 2000 gram sample.

To the above prepared sample was added 0.125 gram of 50% aqueous disodium phosphate in order to adjust the viscosity from 6300 centistokes (cs) to 5700 cs. Viscosities were measured at 0.3 rpm using a Brookfield Model LTVDV-II viscometer and SC4-31 small chamber adapter-spindle combination at 0° C., unless otherwise noted. The viscosity responses to the shear rate, to the temperature, and to water dilution of the composition are given in Table I below. It should be noted that 30 rpm represents the point at which the shear force is great enough to cause the compositions to change viscosity, roughly equivalent to the shear force on the wing at an early point during aircraft takeoff when it is desirable that the anti-icing fluids flow off.

TABLE I

| Sample | Temp. °C. | 0.3 rpm | 0.6 rpm | 1.5 rpm | 3 rpm | 6 rpm | 12 rpm | 30 rpm |
|---|---|---|---|---|---|---|---|---|
| Neat | 20 | 3400 | 2400 | 1480 | 1260 | 985 | 700 | 485 |
|  | 0 | 5700 | 3750 | 2400 | 1820 | 1380 | 1045 | 737 |
|  | −10 | 5100 | 3750 | 2560 | 1960 | 1550 | 1200 | 886 |
|  | −20 | 4000 | 2600 | 2060 | 1650 | 1350 | 1178 | 915 |
| +5% water | 0 | 5900 | 4000 | 2820 | 2020 | 1500 | 1120 | 778 |
| +15% water | 0 | 8800 | 5700 | 3560 | 2520 | 1790 | 1305 | 877 |
| +25% water | 0 | 8400 | 5350 | 3320 | 2310 | 1665 | 1210 | 800 |

Shear Rate and Temperature Dependencies: Viscosity Responses of Dilution of Example I

EXAMPLE II

A mixture of Carbopol 672, 48 grams, and Carbopol 1610, 12 grams, was added to 1940 grams of deionized water to make up a stock solution of 3.0% polyacrylic acid in water. The above prepared mixture, 83.25 grams thereof, after diluted to 300 grams with deionized water was added to a mixture of propylene glycol, 500 grams; sodium tolyl triazole, 5 grams of a 50% aqueous solution; and Surfonic N-95, 5 grams. Finally, deionized water was added to make up a 2000 gram sample.

To the above prepared sample was added 2.58 grams of 50% aqueous propylene glycol in order to adjust the viscosity from 7800 centistokes (cs) to 5700 cs. Viscosities were measured at 0.3 rpm using a Brookfield Model LTVDV-II viscometer and SC4-31 small chamber adapter-spindle combination at 0° C., unless otherwise noted. The viscosity responses to the shear rate, to the temperature, and to water dilution of the composition are given in Table II below.

TABLE II

| Sample | Temp. °C. | 0.3 rpm | 0.6 rpm | 1.5 rpm | 3 rpm | 6 rpm | 12 rpm | 30 rpm |
|---|---|---|---|---|---|---|---|---|
| Neat | 20 | 4500 | 2650 | 1860 | 1390 | 960 | 770 | 528 |
|  | 0 | 6000 | 4150 | 2700 | 1960 | 1465 | 1150 | 777 |
|  | −10 | 5600 | 3950 | 2780 | 2070 | 1645 | 1298 | 955 |
|  | −20 | 3400 | 3300 | 2060 | 1610 | 1300 | 1167 | 882 |

Shear Rate and Temperature Dependencies: Viscosity Responses of Dilution of Example II TABLE II-continued

| Sample | Shear Rate and Temperature Dependencies; Viscosity Responses of Dilution of Example II | | | | | | | |
|---|---|---|---|---|---|---|---|---|
| | Temp. °C. | 0.3 rpm | 0.6 rpm | 1.5 rpm | 3 rpm | 6 rpm | 12 rpm | 30 rpm |
| +5% water | 0 | 8700 | 5950 | 3760 | 2660 | 1930 | 1415 | 962 |
| +15% water | 0 | 12300 | 8100 | 4800 | 3310 | 2325 | 1657 | * |
| +25% water | 0 | 11700 | 7750 | 4440 | 3060 | 2165 | 1538 | 999 |

*Values more than 1000 are out of range with SC4-31 chamber spindle configuration.

EXAMPLE III

A composition consisting of Carbopol 672 polyacrylic acid resin, 0.6 grams; Carbopol 1610 hydrophobe modified polyacrylic acid resin, 0.15 grams; propylene glycol, 150 g.; ethylene glycol, 15 g., sodium hydroxide, 0.176 g.; sodium tolyltriazole, 1.5 g.; Surfonic N-95 surfactant, 1.5 g.; and water, 131.07 g. was prepared. The viscosity responses to the shear rate, to the temperature, and to water dilution of the composition, measured as in Examples I and II, are given in Table III below.

TABLE III

| Sample | Shear Rate and Temperature Dependencies; Viscosity Responses of Dilution of Example III | | | | | | | |
|---|---|---|---|---|---|---|---|---|
| | Temp. °C. | 0.3 rpm | 0.6 rpm | 1.5 rpm | 3 rpm | 6 rpm | 12 rpm | 30 rpm |
| Neat | 20 | 3500 | 2600 | 1680 | 1240 | 905 | 660 | 464 |
| | 0 | 6000 | 4200 | 2920 | 2110 | 1580 | 1200 | 842 |
| | −10 | 6200 | 4700 | 3200 | 2470 | 1920 | 1500 | * |
| | −20 | 6300 | 5100 | 3700 | 2980 | 2380 | 1900 | * |
| +5% water | 0 | 7100 | 5000 | 3220 | 2330 | 1740 | 1290 | 900 |
| +15% water | 0 | 10000 | 7050 | 4340 | 3060 | 2170 | 1570 | * |
| +25% water | 0 | 9400 | 6600 | 4060 | 2840 | 2000 | 1440 | 954 |

*Values more than 1000 are out of range with SC4-31 chamber spindle configuration.

EXAMPLE IV

This is a comparative example illustrating that undesirable viscosity responses to the temperature changes and water dilution of the composition were obtained in a formula using Carbopol 672 resin alone in a composition otherwise similar to that of Example III.

A composition consisting of Carbopol 672 polyacrylic acid resin, 0.75 grams; propylene glycol, 150 g.; ethylene glycol, 15 g., sodium hydroxide, 0.146 g.; sodium tolyltriazole, 1.5 g.; Surfonic N-95 surfactant, 1.5 g.; and water, 131.10 g. was prepared. The viscosity responses to the shear rate, to the temperature, and to water dilution of the composition, measured as in Examples I and II, are given in Table IV below.

TABLE IV

| Sample | Shear Rate and Temperature Dependencies; Viscosity Responses of Dilution of Example IV | | | | | | | |
|---|---|---|---|---|---|---|---|---|
| | Temp, °C. | 0.3 rpm | 0.6 rpm | 1.5 rpm | 3 rpm | 6 rpm | 12 rpm | 30 rpm |
| Neat | 20 | 2700 | 1950 | 1360 | 1060 | 820 | 640 | 464 |
| | 0 | 6000 | 4650 | 3160 | 2420 | 1835 | 1420 | 998 |
| | −10 | 8900 | 6600 | 4500 | 3400 | 2630 | 2028 | * |
| | −20 | 11000 | 8400 | 6200 | 4800 | 3750 | * | * |
| +5% water | 0 | 6400 | 4900 | 3340 | 2510 | 1880 | 1440 | * |
| +15% water | 0 | 6500 | 4900 | 3300 | 2450 | 1825 | 1370 | 940 |
| +25% water | 0 | 4600 | 3500 | 2420 | 1860 | 1410 | 1080 | 748 |

*Values more than 1000 are out of range with SC4-31 chamber spindle configuration.

From the data in Tables I, II and III it may be seen that the compositions of the present invention retain a consistent, high viscosity as the compositions are diluted with water; this was unexpected. Additionally, the viscosities under these low shear conditions are relatively insensitive to temperatures changes over the tested range of −20° C. to 20° C. It is, of course, expected that the compositions of this invention would find utility outside of the temperature test range. This fact permits the aircraft anti-icing fluids to have a relatively predictable thickness upon a wing surface, and leads to predictability in the holdover time over a wide range of temperature.

Many modifications may be made in the process of this invention without departing from the spirit and scope thereof which are defined only in the appended claims. For example, one skilled in the art may discover that particular compounds or proportions thereof, which may not be explicitly recited herein, but which are nevertheless anticipated, would give desirable results. It will also be appreciated that the anti-icing compositions may also find uses as de-icers, and that surfaces other than airfoils could also be treated with these materials, such as vehicle windshields and exposed stationary surfaces that need to be free from ice.

I claim:

1. An anti-icing composition comprising:
   between about 50 and about 65 wt. % of an alkylene glycol component;
   between about 0.2 and about 0.8 wt. % of a thickener blend having:
      from about 65 to 98 wt. % of at least one polyacrylic acid; and
      from about 2 to 35 wt. % of at least one copolymer of acrylic acid and a hydrophobic vinyl monomer, the latter selected from the group consisting of n-decyl acrylate; n-decyl methacrylate; isodecyl acrylate; isodecyl methacrylate; Lauryl acrylate; Lauryl methacrylate; n-octyl acrylate; n- octyl methacrylate; 2-ethyl-hexyl acrylate;

2-ethylhexyl methacrylate; and mixtures thereof; and a neutralizing agent where enough neutralizing agent is present to neutralize between about 20 to about 90 wt. % of the carboxylic acid groups present in the thickener blend.

2. The anti-icing composition of claim 1 where the alkylene glycol component is selected from the group consisting of ethylene glycol, propylene glycol, diethylene glycol, dipropylene glycol and mixtures thereof.

3. The anti-icing composition of claim 1 where the neutralizing agent is selected from the group consisting of alkaline metal hydroxides, organic amine bases and mixtures thereof.

4. The anti-icing composition of claim 1 where the polyacrylic acid has a weight average molecular weight of between about 2,500,000 and about 3,500,000.

5. The anti-icing composition of claim 1 where the composition additionally comprises other components selected from the group consisting of a corrosion inhibitor, a non-ionic surfactant, deionized water and mixtures thereof.

6. The anti-icing composition of claim 5 where the non-ionic surfactant is present in an amount between about 0.1 and about 0.5% by weight of the anti-icing composition.

7. The anti-icing composition of claim 5 where the corrosion inhibitor is selected from the group consisting of an alkaline metal salt of tolyl triazole, an alkaline metal salt of benzotriazole, and mixtures thereof.

8. The anti-icing composition of claim 5 where the corrosion inhibitor is present in an amount between about 0.2 and about 0.5% by weight of the anti-icing composition.

9. An anti-icing composition comprising:
between about 50 and about 65 wt. % of an alkylene glycol component selected from the group consisting of ethylene glycol, propylene glycol, diethylene glycol, dipropylene glycol and mixtures thereof;
between about 0.2 and about 0.8 wt. % of a thickener blend having:
at least one polyacrylic acid having a weight average molecular weight of between about 2,500,000 and about 3,500,000; and
at least one copolymer of acrylic acid and a hydrophobic vinyl monomer, the latter selected from the group consisting of n-decyl acrylate; n-decyl methacrylate; isodecyl acrylate; isodecyl methacrylate; Lauryl acrylate; Lauryl methacrylate; n-octyl acrylate; n-octyl methacrylate; 2-ethylhexyl acrylate; 2-ethylhexyl methacrylate; and mixtures thereof;
where the thickener blend comprises from about 65 to about 98% by weight of the polyacrylic acid and from about 2 to about 35% by weight of the copolymer of acrylic acid and the vinyl monomer; and
a neutralizing agent where enough neutralizing agent is present to neutralize between about 20 to about 90 wt. % of the carboxylic acid groups present in the thickener blend.

10. The anti-icing composition of claim 9 where the neutralizing agent is selected from the group consisting of alkaline metal hydroxides, organic amine bases and mixtures thereof, and where enough of the neutralizing agent is present to neutralize between about 20 to 90 wt. % of the carboxylic acid groups present in the thickener blend.

11. The anti-icing composition of claim 9 where the composition additionally comprises other components selected from the group consisting of a corrosion inhibitor, a non-ionic surfactant, deionized water and mixtures thereof.

12. The anti-icing composition of claim 11 where the non-ionic surfactant is present in an amount between about 0.1 and about 0.5% by weight of the anti-icing composition.

13. The anti-icing composition of claim 11 where the corrosion inhibitor is selected from the group consisting of an alkaline metal salt of tolyl triazole, an alkaline metal salt of benzotriazole, and mixtures thereof, and where the corrosion inhibitor is present in an amount between about 0.2 and about 0.5% by weight of the anti-icing composition.

14. A thickened aircraft anti-icing composition comprising:
between about 50 and about 65 wt. % of an alkylene glycol component selected from the group consisting of ethylene glycol, propylene glycol, diethylene glycol, dipropylene glycol and mixtures thereof;
between about 0.2 and about 0.5 wt. % of a corrosion inhibitor selected from the group consisting of an alkaline metal salt of tolyl triazole, an alkaline metal salt of benzotriazole, and mixtures thereof;
between about 0.2 and about 0.8 wt. % of a thickener blend having:
from about 75 to 98 wt. %, based on the blend, of at least one polyacrylic acid having a weight average molecular weight of between about 2,500,000 and about 3,500,000; and
from about 2 to 25 wt. %, based on the blend, of at least one copolymer of acrylic acid and a hydrophobic vinyl monomer, the latter selected from the group consisting of n-decyl acrylate; n-decyl methacrylate; isodecyl acrylate; isodecyl methacrylate; Lauryl acrylate; Lauryl methacrylate; n-octyl acrylate; n-octyl methacrylate; 2-ethylhexyl acrylate; 2-ethylhexyl methacrylate; and mixtures thereof;
a neutralizing agent is selected from the group consisting of alkaline metal hydroxides, organic amine bases and mixtures thereof, where enough neutralizing agent is present to neutralize between about 20 to 90 wt. % of the carboxylic acid groups present in the thickener blend; and
deionized water.

15. The thickened aircraft anti-icing composition of claim 14 additionally comprising between about 0.1 and about 0.5 wt. % of a non-ionic surfactant.

* * * * *